June 30, 1959   DU BOIS EASTMAN   2,892,693
METHOD FOR PRODUCTION OF CARBON MONOXIDE AND HYDROGEN
Filed March 20, 1957
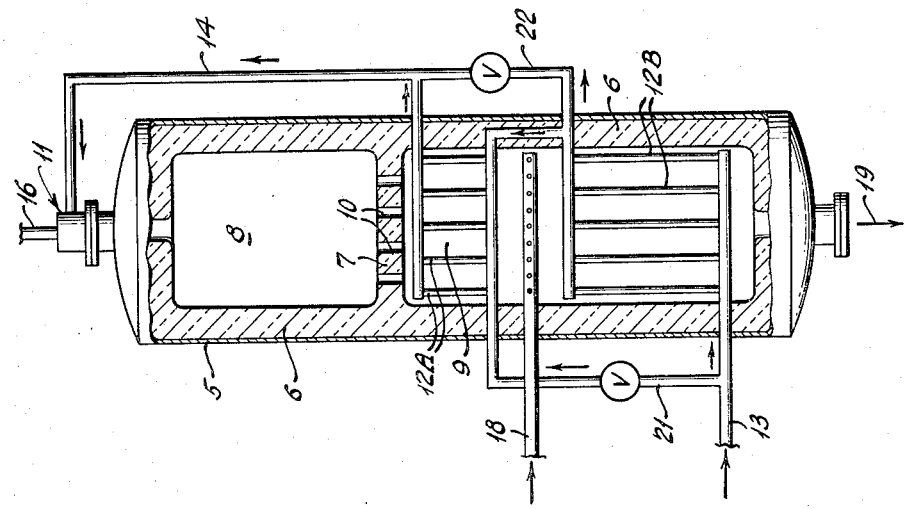
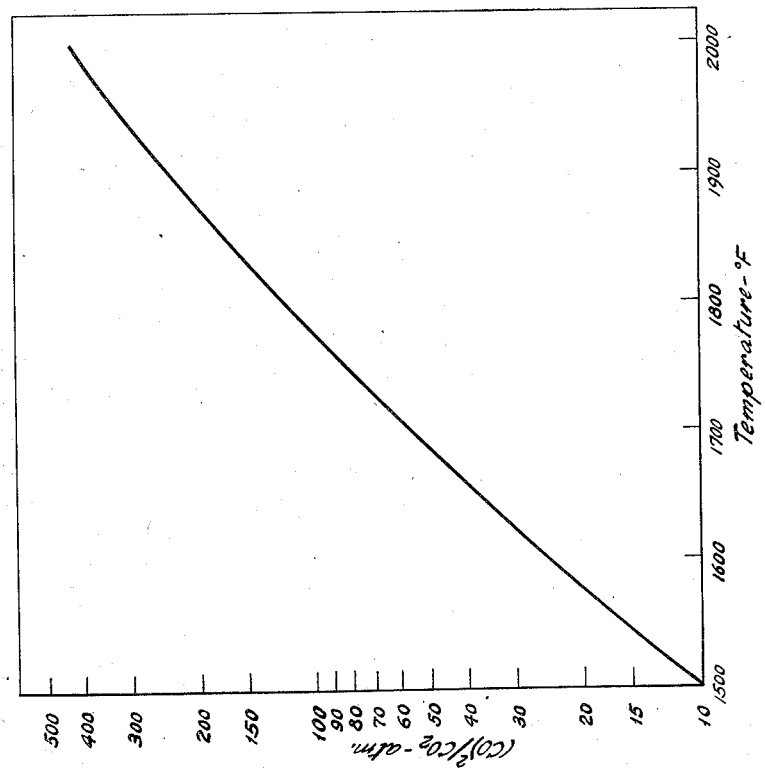

United States Patent Office

2,892,693
METHOD FOR PRODUCTION OF CARBON MONOXIDE AND HYDROGEN

Du Bois Eastman, Whittier, Calif., assignor to Texaco Inc., a corporation of Delaware Application March 20, 1957, Serial No. 647,337

8 Claims. (Cl. 48—196)

This invention relates to a method of and apparatus for generation of carbon monoxide and hydrogen from hydrocarbons. In one of its more specific aspects, the process of this invention relates to the conversion of a normally gaseous hydrocarbon to carbon monoxide and hydrogen by consecutive reaction of the hydrocarbon with steam and free oxygen.

The present invention is directed to an improvement in the generation of synthesis gas from normally gaseous hydrocarbons in which steam is reacted with a normally gaseous hydrocarbon at an elevated pressure over a catalyst effecting partial conversion of the hydrocarbon by reforming with steam followed by reaction of the unconverted hydrocarbon contained in the effluent from the steam-hydrocarbon reforming reaction with oxygen in a zone of partial combustion. Heat for the endothermic reforming reaction is obtained by indirect heat exchange with the hot gases produced in the exothermic partial combustion reaction in two stages as described in more detail hereinafter.

Mixtures of carbon monoxide and hydrogen, or synthesis gas, are useful in the synthesis of hydrocarbons and alcohols. Synthesis gas is also useful as a source of hydrogen for various chemical reactions, particularly hydrogenation and ammonia synthesis. Carbon monoxide contained in synthesis gas mixtures is the full equivalent of hydrogen since it may be made to yield an equivalent quantity of hydrogen by reaction with steam in the water-gas shift reaction. Consequently, by far the larger proportion of ammonia produced at the present time depends upon synthesis gas as a source of hydrogen for the ammonia synthesis reaction.

The so-called "steam-methane" reaction in which a gaseous hydrocarbon is reacted with steam at temperatures in the range of 1200 to 1600° F. has long been known. More recently a commercial process has been developed for the production of synthesis gas from hydrocarbons by direct partial oxidation of the hydrocarbon with free oxygen. The partial oxidation of hydrocarbons may be carried out at temperatures above about 1800° F. When the temperature of the partial oxidation reaction is maintained above about 2200° F., the product synthesis gas is substantially completely free from hydrocarbons even when the reaction is conducted under elevated pressure.

The steam-methane reforming reaction provides satisfactory conversion of hydrocarbons to synthesis gas only at relatively low pressures of the order of atmospheric to 50 p.s.i.g. As the pressure is increased, the unconverted hydrocarbon in the effluent gas stream increases. The partial oxidation with free oxygen, on the other hand, operates satisfactorily at elevated pressures of the order of 100 to 800 p.s.i.g. or higher.

In the steam-methane reforming reaction, usual practice is to pass a mixture of steam and gaseous hydrocarbon over a catalyst maintained at the required reaction temperature of the order of 1300 to 1500° F. In order to maintain the catalyst and reactants at the reaction temperature, due to the highly endothermic nature of the reaction, it is customary to dispose the catalyst in tubes of relatively small diameter, e.g. 4 to 6 inches in diameter, and to place the tubes in a furnace-type structure provided with burners which supply heat to the catalyst and reactants through the walls of the tubes.

The physical limitations of metals and alloys available as materials of construction limit the operation to relatively low pressure. It has been proposed heretofore to avoid the pressure differential across the tubes in the steam-methane reforming reaction by enclosing the tubes within a pressurized chamber. While this proposal is feasible, the effect of pressure on the equilibrium is such that incomplete conversion of methane is obtained when the reforming reaction is carried out at superatmospheric pressure.

It has also been proposed heretofore to effect economies in the generation of synthesis gas by effecting partial conversion of a hydrocarbon with steam in the presence of a reforming catalyst and to complete the conversion of the hydrocarbon by subjecting the product of the reforming step containing unconverted hydrocarbon to partial combustion with free oxygen. Heat required in the endothermic steam-hydrocarbon reforming reaction is supplied by heat exchange with the hot gaseous products from the partial combustion reaction. For a given quantity of synthesis gas, savings of as much as 30 to 35 percent oxygen may be effected, as compared with straight direct partial oxidation. The savings in oxygen is offset to some extent by the increased cost of construction of steam-hydrocarbon reforming facilities designed to operate at elevated pressure.

I have observed that high temperature metal alloys, even those highly resistant to corrosion, such as Inconel, 18–8 stainless and 25–20 stainless steels, are subject to rapid erosion when placed in heat exchanger service in contact with the hot reducing gases which result from the partial oxidation of hydrocarbons with free oxygen. These alloy steels literally disappeared from certain sections of the apparatus handling the hot gases from synthesis gas generators at elevated temperature and pressure.

I have now devised a method of operation which permits the combination of the steam-hydrocarbon reaction at elevated pressure with partial oxidation of the unconverted portion of the hydrocarbon and with heat exchange between the hot gases from the zone of partial combustion and the catalyst and reactants in the steam-hydrocarbon reforming reaction zone without serious erosion of high temperature steel alloys. As produced, the hot synthesis gas is decarburizing with respect to iron, as expressed in the following reaction:

$$Fe+2CO \rightleftharpoons FeC+CO_2$$

As the effluent from the synthesis gas generator is cooled, a transition temperature is reached at which the mixture shifts from decarburizing to carburizing with respect to iron. The region where the transition takes place may be considered a critical temperature range in that there is very rapid attack on even highly corrosion resistant iron alloys. Normal fluctuations in the operating conditions of the synthesis gas generator result in fluctuations in temperature at any given point in the heat exchange apparatus with the result that some of the metal in the heat exchange system wherein the hot gases undergo cooling is subjected alternately to carburizing conditions and to decarburizing conditions. Although I do not wish to limit my invention by any theories, apparently it is the alternate carburizing-decarburizing atmosphere that causes erosion.

The equilibrium temperature, or the transition temperature of the carburizing-decarburizing reaction, may be estimated from the composition of the synthesis gas according to the following table:

TABLE I

| Temp. (°F.): | $(CO)^2/CO_2$ (atm.) |
|---|---|
| 2,000 | 425 |
| 1,900 | 235 |
| 1,800 | 120 |
| 1,700 | 57 |
| 1,600 | 25 |
| 1,500 | 10 | wherein CO represents the partial pressure of carbon monoxide in atmospheres and $CO_2$ represents the partial pressure of carbon dioxide in atmospheres.

My invention takes advantage of this discovery by employing heat exchange between the hot gaseous products of reaction of partial combustion, and the catalyst and reactants in the reforming zone at temperatures both above and below the transition temperature on the carburization-decarburization curve. Thus, in carrying out the process according to my invention, a normally gaseous hydrocarbon is mixed with steam, preheated to a suitable temperature, and subjected to reforming. From 2 to 5 parts steam per part hydrocarbon may be used. In reforming, the mixture of hydrocarbon and steam is passed into contact with a steam-hydrocarbon reforming catalyst in heat exchange with hot synthesis gas. The heat exchange is carried out first with previously cooled synthesis gas from a partial combustion reaction zone at a temperature below the transition temperature effecting a conversion of a portion of the hydrocarbon with steam. The heat exchange is then carried out with hot gases from the partial combustion reaction at a temperature above the transition temperature, effecting further conversion of the hydrocarbon by reaction with steam. Preferably, from 20 to 55 percent conversion of the hydrocarbon is effected in the reforming step. Finally, the effluent from the steam-hydrocarbon reforming step, containing carbon monoxide and hydrogen, together with unreacted steam and hydrocarbon, is passed into admixture with free oxygen into the zone of partial combustion. In the zone of partial combustion, residual unconverted hydrocarbon from the steam-hydrocarbon reforming step is substantially completely converted to carbon monoxide and hydrogen.

The hydrocarbon-steam reforming reaction zone is divided into two sections. Intermediate the two sections of the reforming reaction zone, the hot synthesis gas from the zone of partial combustion is quench cooled from a temperature somewhat above the transition temperature to a temperature below the transition temperature by the addition of a suitable cooling fluid to the hot gas stream. In general, it is desirable to quench cool the gases through a range of about 100° F., although a wider range may be required in cases where there is considerable fluctuation in the composition of the synthesis gas. The cooling range, therefore, generally should be from about 50° F. above the transition temperature to about 50° F. below the transition temperature under normal operating conditions. As intimated above, in some cases it may be desirable to quench cool the gas from a temperature 100 to 200° F. above the transition temperature to a temperature 100 to 200° F. below the transition temperature.

Suitable fluid cooling media for quench cooling the synthesis gas include steam and carbon dioxide, which may be termed fully oxidized products of combustion of a hydrocarbon. Of these, steam is generally preferred since it is easily separated from the synthesis gas. Carbon monoxide, hydrogen, mixtures of carbon monoxide and hydrogen, and mixtures of hydrogen, carbon monoxide, or both, with steam, carbon dioxide, or both, are suitable fluid cooling media. It is sometimes advantageous to recirculate cooled synthesis gas from the outlet of the second heat exchange section employed in carrying out the steam-hydrocarbon reforming reaction to the intermediate section to effect quench cooling. This is more fully explained hereinafter in the detailed description of a specific embodiment of the present invention.

As previously stated, the transition temperature may be estimated from the composition of the product gas from the zone of partial combustion. Two examples will serve to illustrate the method of determining the transition temperature. In both cases the total pressure is 30 atmospheres absolute.

*Case I*

| Gas Composition | Mols | Mol Percent | Atm. |
|---|---|---|---|
| Carbon monoxide | 90 | 22.5 | 6.7 |
| Carbon dioxide | 10 | 2.5 | 0.8 |
| Water | 85 | 21.2 | 6.4 |
| Hydrogen | 215 | 53.8 | 16.1 |
| | 400 | 100.0 | 30.0 |

*Case II*

| Gas Composition | Mols | Mol Percent | Atm. |
|---|---|---|---|
| Carbon monoxide | 58 | 15.4 | 4.6 |
| Carbon dioxide | 17 | 4.5 | 1.4 |
| Water | 136 | 36.3 | 10.9 |
| Hydrogen | 164 | 43.8 | 13.1 |
| | 375 | 100.0 | 30.0 |

The transition temperature for Case I is determined as follows. The value for the equilibrium constant $(CO)^2/CO_2$ is calculated, i.e. $(6.7)^2/0.8 = 56$. With reference to Fig. 1 of the drawings, which is a graphical representation of the information appearing in Table I, it will be found that the transition temperature corresponding to the equilibrium constant for $(CO)^2/CO_2 = 56$ is approximately 1700° F. Similarly, the value $(CO)^2/CO_2$ for Case II is $(4.6)^2/1.4$ or 15.1. With reference to Fig. 1, the transition temperature for Case II is found to be about 1550° F.

In Case I in which the equilibrium temperature is approximately 1700° F., the hot gas from the partial oxidation reaction step is cooled by heat exchange with the steam-methane reforming reactor to a temperature not below about 1750° F. or 50° F. higher than the transition temperature in the hotter section of the heat exchange system. A suitable fluid coolant, for example steam at 500° F., is then injected into the hot synthesis gas stream, quench cooling it to a temperature not above about 1650° F. or 50° F. below the transition temperature. Following the quench cooling, the synthesis gas is again contacted with the heat exchange surfaces of the steam-hydrocarbon reforming reaction zone in the cooler section of the heat exchange system. Similarly, in Case II in which the equilibrium temperature is approximately 1550° F., the hot gases from the synthesis gas generator are first cooled to a temperature not below 1600° F. by heat exchange with the heat exchange surfaces of the reforming reactor, quench cooled through the region 1600 to 1500° F., and again contacted with heat exchange surfaces of the reforming reaction zone.

My invention will be more readily understood from the following description. Fig. 2 of the drawings illustrates diagrammatically one method in which the process of this invention may be carried out. With reference to Fig. 2, the numeral 5 designates a cylindrical pressure vessel shell designed to withstand operating pressure, for example a pressure within the range 100 to 800 p.s.i.g., provided with an insulating refractory lining 6. A partition 7 divides the vessel into an unpacked reaction chamber 8 suitable for conducting non-catalytic partial oxidation reaction between a hydrocarbon and free oxygen, and a heat exchange zone 9. A suitable mixer-burner 11 is provided in the inlet to reaction chamber 8. Outlets 10 in partition 7 permit products of the partial oxidation reaction to pass into heat exchange zone 9. In heat exchange zone 9 are tubular reactors 12A and 12B adapted for carrying out the hydrocarbon-steam reforming reaction. Product synthesis gas is discharged from the reactor system through outlet 19.

A mixture of gaseous hydrocarbon and steam, suitably preheated, for example, preheated to about 800° F., is introduced through line 13 into tubes 12B which preferably contain a steam-methane reforming catalyst. Such catalysts are well known; nickel oxide is a commonly-used catalyst. In tubes 12B a portion of the reforming reaction is carried out; heat for the steam-hydrocarbon reaction is supplied by heat exchange with hot gases from reaction zone 8 as described in more detail hereinafter. A portion of the hydrocarbon is converted to carbon monoxide and hydrogen in tubes 12B. From tubes 12B the partially reformed effluent passes into tubes 12A which, like the tubes 12B, also contain reforming catalyst. Further reforming of the hydrocarbon takes place in tubes 12A in heat exchange with hot gases from reaction zone 8. The effluent from reforming tubes 12A pass via line 14 to burner 11 where it is mixed with oxygen introduced through line 16 in an amount sufficient to react with the unconverted hydrocarbon contained in the effluent from reforming sections 12A and 12B and autogeneously maintain the temperature within the reaction zone above about 2000° F. and preferably in the range 2200 to 3000° F.

The hot effluent gases from reaction zone 8 are discharged through openings 10 and passed first over the exterior surface of tubes 12A supplying heat by heat exchange to the catalyst and reactants within the tubes. The heat exchange with tubes 12A reduces the temperature of the gases from reactor 8 to a temperature not below 50 to 100° F. above the carburizing-decarburizing transition temperature defined hereinabove. At this point, the gases are quench cooled almost instantaneously through the critical temperature region from above the transition temperature to below the transition temperature by injection of coolant into the gases at a suitable temperature through line 18.

The coolant may be at any suitable temperature below the transition temperature. It has been found that steam is particularly suitable as a cooling medium for quench cooling the partial combustion products from gas generation zone 8 through the critical temperature region. Another particularly good cooling medium is the cooled gas itself which may be recirculated from outlet 19 to pipe 18.

The quench cooled gases, at a temperature below the transition temperature, are then brought into contact with tubes 12B to supply heat to the catalyst and reactants contained therein effecting conversion to carbon monoxide and hydrogen by the steam-hydrocarbon reaction. The cooled gaseous reaction products are discharged from the reactor through outlet 19 for further treatment.

The reaction in reforming reaction zones 12A and 12B converts a portion, for example 10 to 60 percent, of the hydrocarbon to carbon monoxide and hydrogen by reaction with steam and at the same time preheats the reactants supplied through line 14 to reaction zone 8 to a temperature well above the maximum permissible preheat temperature normally obtainable. As an aid in controlling the temperatures within the various reaction zones, lines 21 and 22 may be provided, together with suitable control valves, to permit bypassing either section 12A or 12B of the reforming reaction zone with a portion of the feed stream.

*Example*

A mixture of steam and methane containing two mols steam per mol methane is preheated to 800° F. and fed at the rate of about 85.3 M s.c.f.h. (thousand standard cubic feet per hour) to a reaction system as described herein. The feed mixture at about 450 p.s.i.g. contacts a hydrocarbon-steam reforming catalyst contained in tubes in heat exchange with hot gases from a partial oxidation reaction zone as illustrated in the accompanying drawing. The steam-hydrocarbon reforming reactor is divided into two sections, as described above. The mixture of hydrocarbon and steam first enters the cooler section of the steam-methane reforming reactor and then passes into the hotter section. The effluent gas from the steam-hydrocarbon reforming reaction has the following approximate composition:

|  | Mols | Mol Percent |
|---|---|---|
| Carbon monoxide | 19 | 6.4 |
| Carbon dioxide | 16 | 5.4 |
| Steam | 99 | 33.6 |
| Hydrogen | 121 | 41.0 |
| Methane | 40 | 13.6 |

This effluent from the steam-methane reforming reaction at about 1500° F. and about 225 p.s.i.g. is fed to the partial oxidation reaction zone into admixture with 15.16 M s.c.f.h. of oxygen preheated to 300° F. The temperature in the partial oxidation reaction zone is autogeneously maintained at 2700° F. Product gas, or synthesis gas, from the partial oxidation reaction zone has the following approximate composition:

| | Mol percent |
|---|---|
| Carbon monoxide | 15.5 |
| Carbon dioxide | 4.3 |
| Steam | 37.5 |
| Hydrogen | 42.4 |
| Methane | 0.3 |

The hot synthesis gas from the partial combustion zone is passed into the hot section of the heat exchange zone into contact with tubes containing catalyst for the steam-hydrocarbon reaction where the synthesis gas is cooled by heat exchange to a temperature of approximately 1600° F. The transition temperature for the mixture leaving the zone of partial combustion is calculated from the composition of the product gas as indicated in connection with Case I and Case II above.

|  | Mol Percent | Atm. |
|---|---|---|
| Carbon monoxide | 15.5 | 4.6 |
| Carbon dioxide | 4.3 | 1.3 |
| Steam | 37.5 | 11.3 |
| Hydrogen | 42.4 | 12.7 |
| Methane | 0.3 | 0.1 |
|  |  | 30.0 |

The value for the equilibrium constant for $(CO)^2/CO_2$ is $(4.6)^2/1.3 = 16.3$. With reference to Fig. 1, it will be seen that the value for $(CO)^2/CO_2$ corresponds to a transition temperature of approximately 1550° F.

Quench cooling of the hot synthesis gas through the critical temperature range of 1600° F. to 1500° F. intermediate sections of the steam-methane reforming reaction zone is accomplished by injecting 500° F. steam at the rate of 9.5 M s.c.f.h. into the synthesis gas at this point. The resulting mixture is then passed in heat exchange with the steam-methane reforming reactants and catalyst in the cooler section of the heat exchange zone.

Product gas is discharged from the heat exchange zone of the reaction vessel at a temperature of approximately 1,040° F. The product gas has the following approximate composition on a dry basis:

| | |
|---|---|
| Carbon monoxide | 24.9 |
| Carbon dioxide | 6.8 |
| Hydrogen | 67.8 |
| Methane | 0.5 |

As indicated herein, the steam-hydrocarbon reforming catalyst may be a conventional catalyst and is not, per se, a part of the present invention. Steam-hydrocarbon reforming catalysts conventionally consist of metal oxides, such as an oxide of iron, nickel, cobalt, frequently in admixture with one or more of the following: alumina, aluminum silicate, bauxite, kaolin, and rare earth metal oxides. Particularly effective catalysts are iron and nickel oxides together with compounds of aluminum, silicon, boron or phosphorus, for example aluminum silicate, bauxite, kaolin and the like. Another example of a suitable catalyst is one which consists of nickel oxide promoted with alumina and supported on unglazed porcelain.

Obviously, many modifications and variations of the invention, as hereinbefore set forth, may be made without departing from the spirit and scope thereof, and therefore only such limitations should be imposed as are indicated in the appended claims.

I claim:

1. A process for the production of carbon monoxide and hydrogen from a gasiform hydrocarbon which comprises reforming a minor part of said hydrocarbon with steam in a first reforming reaction zone; passing effluent from said first reaction zone to a second reforming reaction zone; reforming a further part of said hydrocarbon with steam in said second reaction zone; subjecting effluent from said second reaction zone comprising carbon monoxide, carbon dioxide and unreacted hydrocarbon to partial oxidation in a zone of partial combustion autogenously maintained at a temperature in the range of 2000° F. to 3000° F. with oxygen in an amount effecting substantially complete conversion of said hydrocarbon to carbon monoxide and hydrogen; passing hot effluent product gases comprising carbon monoxide, hydrogen, and carbon dioxide from said partial oxidation reaction zone through a first cooling zone in indirect heat exchange relationship with reactants in said second reforming reaction zone at a temperature above the transition temperature for the reaction $Fe+2CO \rightleftharpoons FeC+CO_2$; said transition temperature representing the temperature at which the equilibrium between carbon monoxide and carbon dioxide shifts from decarburizing to carburizing with respect to iron; further cooling said product gases from a temperature above said transition temperature to a temperature below said transition temperature in a second cooling zone by admixing a fluid cooling medium therewith; thereafter passing said product gases through a third cooling zone in indirect heat exchange relationship with reactants in said first reforming reaction zone; and withdrawing cooled product gases comprising carbon monoxide and hydrogen from said third cooling zone.

2. A process as defined in claim 1 wherein the temperature in each of said reforming zones is within the range of 1200° F. to 1600° F.

3. A process as defined in claim 1 wherein said cooling medium comprises steam at a temperature of the order of several hundred degrees Fahrenheit below said transition temperature.

4. A process as defined in claim 1 wherein said mixture of steam and hydrocarbon supplied to said first reaction zone contains from 1 to 5 mols of steam per mol of carbon contained in said hydrocarbon.

5. A process as defined in claim 1 wherein the pressure maintained within said reaction zones is within the range of from about 100 to 800 pounds per square inch gauge.

6. A process as defined in claim 1 wherein from 20 to 60 percent of the hydrocarbon feed to the process is converted in the reforming reaction zones.

7. A process as defined in claim 1 wherein said hydrocarbon consists essentially of methane.

8. A process for the production of carbon monoxide and hydrogen from a gasiform hydrocarbon which comprises passing a mixture of said hydrocarbon and steam into a first reaction zone into contact with a steam-hydrocarbon reforming catalyst maintained at reaction temperature effecting conversion of part of said hydrocarbon to carbon monoxide, carbon dioxide, and hydrogen; passing effluent gases from said first reaction zone into contact with steam-hydrocarbon reforming catalyst in a second reaction zone maintained at reaction temperature effecting conversion of a further part of said hydrocarbon to carbon monoxide, carbon dioxide, and hydrogen; passing effluent gases from said second reaction zone in admixture with free oxygen into an unpacked partial oxidation reaction zone autogenously maintained at a temperature within the range of 2000° F. to 3000° F. effecting substantially complete conversion of unconverted hydrocarbon to carbon monoxide and hydrogen; passing effluent product gases comprising carbon monoxide, carbon dioxide, and hydrogen from said zone of partial oxidation through a first cooling zone in indirect heat exchange relationship with said catalyst and said reactants in said second steam-hydrocarbon reforming zone at a temperature above the transition temperature for the reaction $$Fe+2CO \rightleftharpoons FeC+CO_2$$

said transition temperature representing the temperature at which the equilibrium between carbon monoxide and carbon dioxide shifts from decarburizing to carburizing with respect to iron; further cooling said product gases from a temperature above said transition temperature to a temperature below said transition temperature in a second cooling zone by injecting a fluid cooling medium into said hot gases and thereafter passing resulting cooled product gas mixture through a third cooling zone in indirect heat exchange relationship with catalyst and reactants contained in said first reaction zone; and withdrawing a cooled product gas comprising carbon monoxide and hydrogen.

References Cited in the file of this patent

UNITED STATES PATENTS

| 1,874,801 | Porter | Aug. 30, 1932 |
| 1,929,665 | Wilcox | Oct. 10, 1933 |
| 1,960,912 | Larson | May 29, 1934 |
| 2,579,843 | Mader | Dec. 25, 1951 |
| 2,700,598 | Odell | Jan. 25, 1955 |